United States Patent
Sun et al.

(10) Patent No.: US 12,443,530 B2
(45) Date of Patent: Oct. 14, 2025

(54) DATA CACHING AND READING METHOD, AND DATA ACCESS SYSTEM

(71) Applicant: HANGZHOU ALICLOUD FEITIAN INFORMATION TECHNOLOGY CO., LTD., Hangzhou (CN)

(72) Inventors: Dapeng Sun, Shanghai (CN); Tao Wang, Shanghai (CN); Shunyang Yao, Shanghai (CN); Xinxin Shu, Shanghai (CN); Kai Zheng, Shanghai (CN); Kunhui Su, Shanghai (CN); Jiajia Li, Shanghai (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,207

(22) PCT Filed: Jan. 9, 2023

(86) PCT No.: PCT/CN2023/071177
§ 371 (c)(1),
(2) Date: Feb. 20, 2024

(87) PCT Pub. No.: WO2023/134604
PCT Pub. Date: Jul. 20, 2023

(65) Prior Publication Data
US 2024/0354251 A1    Oct. 24, 2024

(30) Foreign Application Priority Data
Jan. 13, 2022 (CN) ........................ 202210037805.8

(51) Int. Cl.
*G06F 12/0815* (2016.01)
(52) U.S. Cl.
CPC .............................. *G06F 12/0815* (2013.01)

(58) Field of Classification Search
None
See application file for complete search history.

(56) References Cited

U.S. PATENT DOCUMENTS

| | | | |
|---|---|---|---|
| 6,226,715 B1 * | 5/2001 | Van Der Wolf | ...... G06F 12/121 711/E12.07 |
| 7,475,321 B2 * | 1/2009 | Gurumurthi | ........ G06F 11/0724 711/155 |

(Continued)

FOREIGN PATENT DOCUMENTS

| | | |
|---|---|---|
| CN | 1852318 A | 10/2006 |
| CN | 103595797 A | 2/2014 |

(Continued)

OTHER PUBLICATIONS

Jim Handy, "the Cache Memory book: THE authoritative reference on cache design", 2nd Edition, 1998, pp. 64-67 and 155-186 (Year: 1998).*

(Continued)

*Primary Examiner* — Christopher D Birkhimer
(74) *Attorney, Agent, or Firm* — Wolf, Greenfield & Sacks, P.C.

(57) ABSTRACT

A data caching and reading method, and a data access system are provided. A client sends a first request to a data storage system so as to obtain metadata of target data. The client sends a second request to a data caching system, the second request comprising the metadata. The data caching system determines, on the basis of the metadata, whether cache target data consistent with the target data stored in the data storage system is cached. When it is determined cache target data is cached, the client obtains the target data from the data caching system. When no consistent cache target data is cached, the client obtains the target data from the data (Continued)

storage system, and sends the obtained target data to the data caching system, so as to cache the target data.

20 Claims, 4 Drawing Sheets

(56) References Cited

U.S. PATENT DOCUMENTS

| | | | | |
|---|---|---|---|---|
| 7,558,947 | B1* | 7/2009 | Trivedi | G06F 7/544 |
| | | | | 712/222 |
| 7,644,108 | B1* | 1/2010 | Malmskog | H04L 67/568 |
| | | | | 709/230 |
| 7,681,013 | B1* | 3/2010 | Trivedi | G06F 9/30032 |
| | | | | 712/7 |
| 7,805,575 | B1* | 9/2010 | Agarwal | G06F 12/0811 |
| | | | | 711/141 |
| 7,979,509 | B1* | 7/2011 | Malmskog | H04L 67/2885 |
| | | | | 709/219 |
| 8,364,898 | B2* | 1/2013 | Balakrishnan | G06F 12/0802 |
| | | | | 711/134 |
| 8,370,850 | B2* | 2/2013 | Nochimowski | G06F 3/0679 |
| | | | | 711/123 |
| 8,732,409 | B2* | 5/2014 | Van Der Wolf | G06F 12/0804 |
| | | | | 711/143 |
| 9,026,615 | B1* | 5/2015 | Sirton | H04N 19/593 |
| | | | | 709/217 |
| 9,043,556 | B2* | 5/2015 | Balakrishnan | G06F 12/0808 |
| | | | | 711/133 |
| 9,792,298 | B1 | 10/2017 | Taylor et al. | |
| 9,892,803 | B2* | 2/2018 | Reed | G06F 12/0811 |
| 9,946,648 | B1* | 4/2018 | Zhang | G06F 11/3037 |
| 10,467,143 | B1* | 11/2019 | Mason | G06F 12/0875 |
| 10,891,228 | B2* | 1/2021 | Steinmacher-Burow | G06F 12/0817 |
| 2001/0047454 | A1* | 11/2001 | Soderstrom | G06F 3/0632 |
| | | | | 711/118 |
| 2004/0039880 | A1* | 2/2004 | Pentkovski | G06F 12/0811 |
| | | | | 711/146 |
| 2004/0103251 | A1* | 5/2004 | Alsup | G06F 12/0897 |
| | | | | 711/E12.043 |
| 2006/0143406 | A1* | 6/2006 | Chrysos | G06F 12/0811 |
| | | | | 711/143 |
| 2006/0156155 | A1* | 7/2006 | Gurumurthi | G06F 11/0793 |
| | | | | 714/746 |
| 2010/0070711 | A1* | 3/2010 | Arimilli | G06F 12/0831 |
| | | | | 711/146 |
| 2010/0281216 | A1* | 11/2010 | Patel | G06F 12/121 |
| | | | | 711/E12.017 |
| 2011/0161784 | A1* | 6/2011 | Selinger | G06F 11/1016 |
| | | | | 714/E11.002 |
| 2014/0156909 | A1* | 6/2014 | Farhan | G06F 12/0871 |
| | | | | 711/103 |
| 2014/0237147 | A1* | 8/2014 | Joshi | G06F 3/0664 |
| | | | | 710/74 |
| 2014/0281707 | A1* | 9/2014 | Su | H04L 65/611 |
| | | | | 709/213 |
| 2014/0325148 | A1* | 10/2014 | Choi | G06F 3/0659 |
| | | | | 711/114 |
| 2014/0359221 | A1* | 12/2014 | Kalamatianos | G06F 12/0862 |
| | | | | 711/122 |
| 2014/0365719 | A1* | 12/2014 | Kuzmin | G06F 12/0246 |
| | | | | 711/103 |
| 2014/0372708 | A1 | 12/2014 | Callaway et al. | |
| 2016/0117249 | A1* | 4/2016 | Lin | G06F 12/0833 |
| | | | | 711/119 |
| 2016/0224415 | A1* | 8/2016 | Yoshida | G06F 11/1064 |
| 2016/0246713 | A1* | 8/2016 | Choi | G06F 3/0608 |
| 2016/0253261 | A1* | 9/2016 | Lee | G06F 11/3409 |
| | | | | 711/141 |
| 2017/0139710 | A1* | 5/2017 | Zbiciak | G06F 12/0811 |
| 2017/0300422 | A1* | 10/2017 | Szubbocsev | G06F 12/1009 |
| 2018/0165217 | A1* | 6/2018 | Greenspan | G06F 12/123 |
| 2018/0336141 | A1* | 11/2018 | Desai | G06F 12/1009 |
| 2019/0065560 | A1* | 2/2019 | Rojkov | G06F 16/2272 |
| 2019/0303303 | A1* | 10/2019 | Krishnan | G06F 12/122 |
| 2020/0119753 | A1* | 4/2020 | Chirca | G06F 3/0632 |
| 2020/0125495 | A1* | 4/2020 | Galbi | G06F 12/0804 |
| 2020/0159661 | A1 | 5/2020 | Keymolen et al. | |
| 2020/0356278 | A1* | 11/2020 | Gupta | G06F 3/061 |
| 2020/0356478 | A1* | 11/2020 | Gupta | G06F 12/0897 |
| 2020/0356479 | A1* | 11/2020 | Gupta | G06F 12/122 |
| 2020/0356494 | A1* | 11/2020 | Gupta | G06F 12/123 |
| 2020/0371934 | A1* | 11/2020 | Chachad | G06F 9/30047 |
| 2020/0401521 | A1* | 12/2020 | Elliott | G06F 12/0831 |
| 2022/0244870 | A1* | 8/2022 | Duan | G06F 3/0653 |

FOREIGN PATENT DOCUMENTS

| | | |
|---|---|---|
| CN | 109033363 A | 12/2018 |
| CN | 109189748 A | 1/2019 |
| CN | 110764708 A | 2/2020 |
| CN | 113835614 A | 12/2021 |
| CN | 114051056 A | 2/2022 |

OTHER PUBLICATIONS

International Search Report dated Apr. 6, 2023, in connection with International Application No. PCT/CN2023/071177.
Chinese Search Report dated Mar. 1, 2022, in connection with Chinese Application No. 202210037805.8.
Chinese Office Action dated Mar. 1, 2022, in connection with Chinese Application No. 202210037805.8.

* cited by examiner

DATA CACHING AND READING METHOD, AND DATA ACCESS SYSTEM

CROSS REFERENCE TO RELATED APPLICATIONS

This Application is a national stage filing under 35 U.S.C. 371 of International Patent Application Serial No. PCT/CN2023/071177, filed Jan. 9, 2023, which claims priority to Chinese patent application No. 202210037805.8, filed with the Chinese Patent Office on Jan. 13, 2022, and entitled "Data Caching and Reading Method, and Data Access System". The entire contents of these applications are incorporated herein by reference in their entirety.

TECHNICAL FIELD

The present application relates to a technical field of data caching, in particular, to data caching and reading.

BACKGROUND

In recent years, in the scenarios of big data analyses, cloud-based object storage services are used continually and extensively. When large-scale distributed analysis services read data from the cloud-based object storage services, a substantial amount of hot topic data occupies most of the bandwidths provided by the object storage services, resulting in a poor overall utilization rate of clusters.

As such, a distributed caching system is established by using the spare storage space in a cluster to improve the efficiency of data reading so as to accelerate big data analyses on the object storage services. This is an ideal solution in terms of cost and efficiency.

However, the requirements for strong consistency, high performance, and high availability in big data analyses bring great challenges to the global design, performance indicators, and other aspects of a data caching system.

SUMMARY

According to a first aspect of the disclosure, it is provided a data caching method for a data caching system, including: receiving a request for target data to be acquired sent by a client, the request including metadata of the target data stored in a data storage system; and determining, based on the metadata of the target data, whether cached target data which is consistent with the target data stored in the data storage system is cached in the data caching system.

Optionally, the method may further include: sending location information of the cached target data to the client in the case of determining that the cached target data which is consistent with the target data of the data storage system is cached; and/or sending a consistence failure message to the client in the case of determining that the cached target data which is consistent with the target data of the data storage system is not cached.

Optionally, in the case of determining that the cached target data which is consistent with the target data of the data storage system is not cached, the method may further include: receiving, from the client, the target data acquired by the client from the data storage system; and caching the target data.

Optionally, the step of determining whether the cached target data which is consistent with the target data stored in the data storage system is cached in the data caching system may include: determining, based on identification information of the target data, whether the cached target data corresponding to the target data is cached; and determining, based on metadata of the cached target data and the metadata of the target data, whether the cached target data is consistent with the target data in the case of determining that the cached target data corresponding to the target data is cached.

Optionally, the metadata of the target data is acquired by the client from the data storage system.

Optionally, the metadata of the target data includes at least one of an update time, a cyclic redundancy check value, and a data size of the target data.

According to a second aspect of the disclosure, it is provided a data reading method, including: sending a first request for target data to a data storage system; receiving metadata of the target data from the data storage system; and sending a second request for the target data to a data caching system, the second request including the metadata.

Optionally, the method may further include: acquiring the target data from the data caching system in a case where it is determined by the data caching system, based on the metadata, that data which is consistent with the target data of the data storage system is cached; and/or acquiring the target data from the data storage system in a case where it is determined by the data caching system, based on the metadata, that data which is consistent with the target data of the data storage system is not cached.

Optionally, the method may further include: sending the acquired target data to the data caching system after acquiring the target data from the data storage system.

According to a third aspect of the disclosure, it is provided a data caching apparatus, including a request receiving apparatus for receiving a request for target data to be acquired sent by a client, the request including metadata of target data stored in a data storage system; and a consistency determination apparatus for determining, based on the metadata of the target data, whether cached target data which is consistent with the target data stored in the data storage system is cached in the data caching system.

According to a fourth aspect of the disclosure, it is provided a data reading apparatus, including a first request apparatus for sending a first request for target data to a data storage system; a metadata receiving apparatus for receiving metadata of target data from the data storage system; and a second request apparatus for sending a second request for target data to a data caching system, the second request including the metadata.

According to a fifth aspect of the disclosure, it is provided a data access system, including a data storage system, a data caching system, and a client, wherein the client sends a first request for target data to the data storage system, the data storage system returns metadata of the target data to the client in response to the first request, the client sends a second request for the target data to the data caching system, the second request including the metadata, the data caching system determines, based on the metadata of the target data, whether cached target data which is consistent with the target data stored in the data storage system is cached in the data caching system, the data caching system sends location information of the cached target data to the client in the case of determining that the cached target data which is consistent with the target data of the data storage system is cached, the client acquires the target data from the data caching system, the data caching system sends a consistence failure message to the client in the case of determining that the cached target data which is consistent with the target data of the data storage system is not cached, the client acquires the target data from the data storage system and sends the acquired target data to the data caching system, and the data caching system caches the target data.

According to a sixth aspect of the disclosure, it is provided a computing device, including a processor; and a memory stored thereon with executable codes which, when executed by the processor, enable the processor to execute the method in the first aspect described above.

According to a seventh aspect of the disclosure, it is provided a computer program product including executable codes which, when executed by a processor of an electronic device, enable the processor to execute the method in the first aspect described above.

According to an eighth aspect of the disclosure, it is provided a non-transitory machine-readable storage medium stored thereon with executable codes which, when executed by a processor of an electronic device, enable the processor to execute the method in the first aspect described above.

BRIEF DESCRIPTION OF THE DRAWINGS

The above and other objects, features, and advantages of the present disclosure will become more apparent by describing the exemplary embodiments of the present disclosure in greater detail in conjunction with the accompanying drawings, in which the same reference numerals generally represent the same components in the exemplary embodiments of the present disclosure.

DETAILED DESCRIPTION

The preferred embodiments of the present disclosure will be described in more detailed with reference to the accompanying drawings. Although preferred embodiments of the disclosure are shown in the accompanying drawings, it should be understood that the disclosure may be implemented in various forms, and should not be limited to the embodiments illustrated here. In contrary, these embodiments are provided to enable the disclosure to be more thorough and complete, and to fully convey the scope of the disclosure to those skilled in the art.

Figure 1:
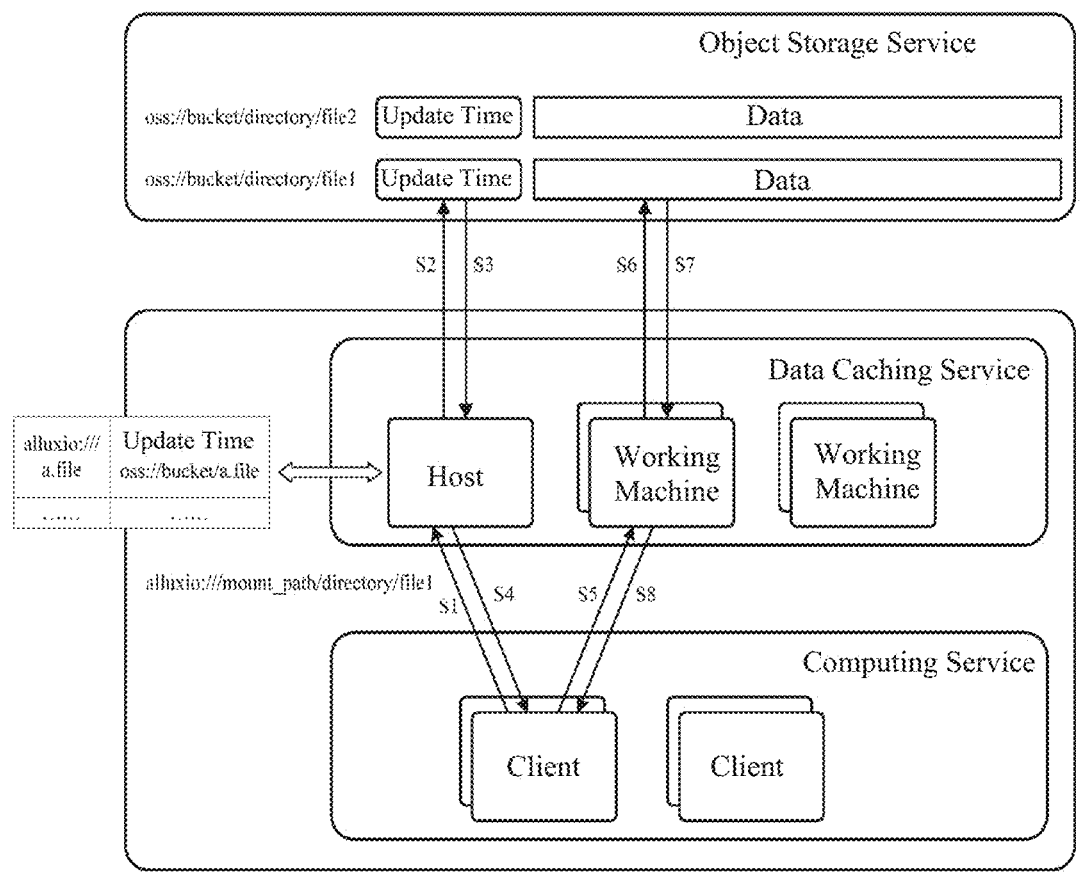
FIG. 1 schematically shows the architecture of an existing caching system, Alluxio.

FIG. 1 schematically shows the architecture of an existing caching system Alluxio.

Alluxio is an abstract file caching system between a computing service and an underlying file (object) storage, mainly providing the caching capability for the underlying file storage.

When use of Alluxio is needed in the computing service to read a file in the object storage services, it is necessary to acquire metadata of a file through the Alluxio service first.

In Step S1, the client in the computing service sends a data request to the host of the data caching service on the basis of a file name maintained by the data caching service, e.g., "alluxio:///mount_path/directory/file1".

The indexing relationship between a file in the object storage service system and that in a data caching service system is established mainly through <file name+update time> of the underlying file within Alluxio, i.e., corresponding to the file name maintained by the stored data caching system and the file name and file update time of a file in the corresponding object storage service system as shown in FIG. 1.

In Step S2, the host of the data caching service system requests for the update time of a corresponding underlying file ("oss://bucket/directory/file1") from the object storage service system, and receives, in Step S3, information regarding the update time of the underlying file returned by the object storage service system.

Afterwards, by comparing the update time received from the object storage service system with that of a file recorded by the data caching service system, the host determines whether the update times are consistent so as to determine whether the file cached by the data caching service system is consistent with data stored in the object storage service system.

No matter whether there is a cached file which is consistent with the underlying file requested, a node of a specified working machine (Alluxio Worker) needs to be connected again. The working machine caches data in a size of 64M by default for storage, and then responds to a read request from the computing service.

The host notifies, in Step S4, the client of the computing service of the specified working machine.

In Step S5, the client requests data from the working machine.

In the event that there is a cached file which is consistent with the requested underlying file, the working machine directly sends, in Step S8, cached data (or a cached file) to the client.

In the event that there is no cached file which is consistent with the requested underlying file, the working machine requests, in Step S6, data of the underlying file from the object storage service system, and receives, in Step S7, data from the object storage service system, and caches the same. Then in Step S8, the cached data (or a cached file) is sent to the client.

However, in the existing technical solution, the validity of caching depends on "an update time" of a requested file recorded in the underlying storage. The update time of a file system is generally on the order of seconds. For millisecond-level update operations such as put and append, it is highly likely to occur within 1 second. When such a millisecond-level update operation occurs and the file system has not been updated, there would be consistency problems if data is read, causing the read data to be incorrect.

Moreover, the solution strongly depends on the node of the Alluxio service, thereby lowering the high availability index of the system. For example, when the Alluxio service is abnormal, the entire storage system will also be inaccessible.

In addition, the underlying object storage service system needs an Alluxio data caching service system for mapping intermediate metadata. The native access path cannot be used in the service. An access through a special path modified by Alluxio is required, and this cannot support transparent caching.

Accordingly, a data caching and reading solution is still needed to solve at least one aspect of the above problems.

A technical problem to be solved by the disclosure is to provide data caching and reading solution which is capable of verifying the consistency between data cached by a data caching system and corresponding data stored in a data storage system conveniently, quickly, timely, and accurately.

The disclosure provides a process of constructing data caching on demand on the basis of a client in a computing service with regard to the scenarios of big data analyses in, for example, a large-scale distributed system, which basically maintains the original access mode and high availability of data, thereby performing transparent acceleration. At the same time, it solves difficulties in determining consistency of distributed caching and the issue regarding cached data update.

Hence, by acquiring metadata of target data via a client from a data storage system as the basis for determining the consistency of cached target data, it is possible to conveniently and quickly, but in real time and accurately, determine whether the data cached by the data caching system is consistent with the corresponding data stored in the data storage system, thereby ultimately ensuring the accuracy of the data acquired by the client.

Figure 2:
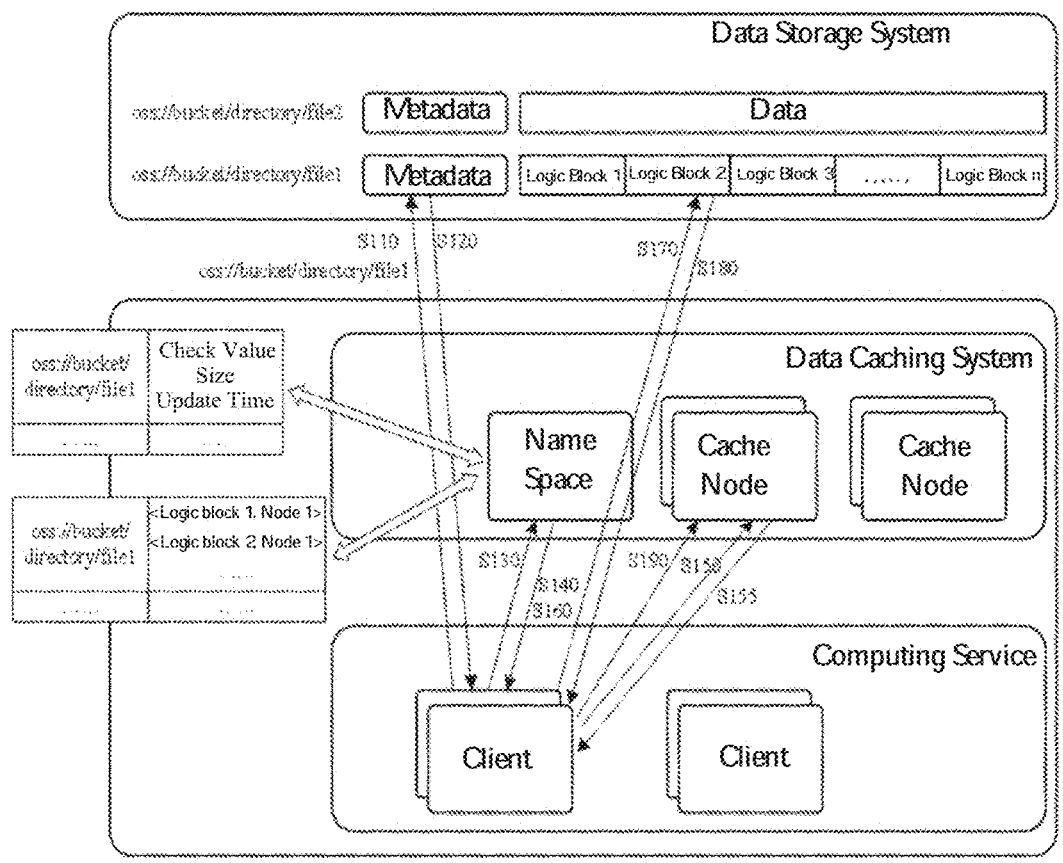
FIG. 2 schematically shows the architecture of a data access system according to the present disclosure.

FIG. 2 schematically shows the architecture of a data access system according to the present disclosure.

As shown in FIG. 2, the data access system according to the present disclosure includes a data storage system, a data caching system, and a client in a computing service.

Figure 3:
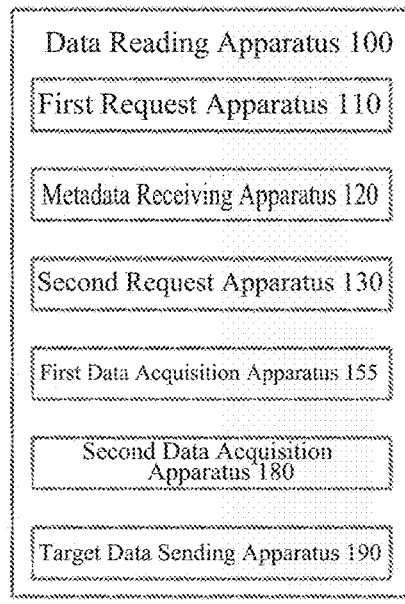
FIG. 3 is a schematic block diagram of a data reading apparatus which may be used in a client in a computing service according to the present disclosure.

FIG. 3 is a schematic block diagram of a data reading apparatus which may be used in a client in a computing service according to the present disclosure.

As shown in FIG. 3, the data reading apparatus 100 may include a first request apparatus 110, a metadata receiving apparatus 120, and a second request apparatus 130. In some embodiments, the data reading apparatus 100 may further include a first data acquisition apparatus 155, a second data acquisition apparatus 180, and a target data sending apparatus 190.

Figure 4:
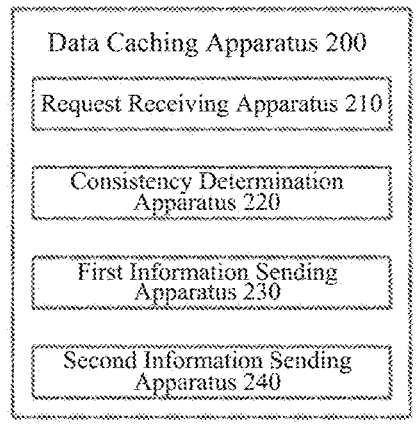
FIG. 4 is a schematic block diagram of a data caching apparatus which may be used in a data caching system according to the present disclosure.

FIG. 4 is a schematic block diagram of a data caching apparatus which may be used in a data caching system according to the present disclosure.

As shown in FIG. 4, the data caching apparatus 200 may include a request receiving apparatus 210, a consistency determination apparatus 220, a first information sending apparatus 230, and a second information sending apparatus 240.

Figure 5:
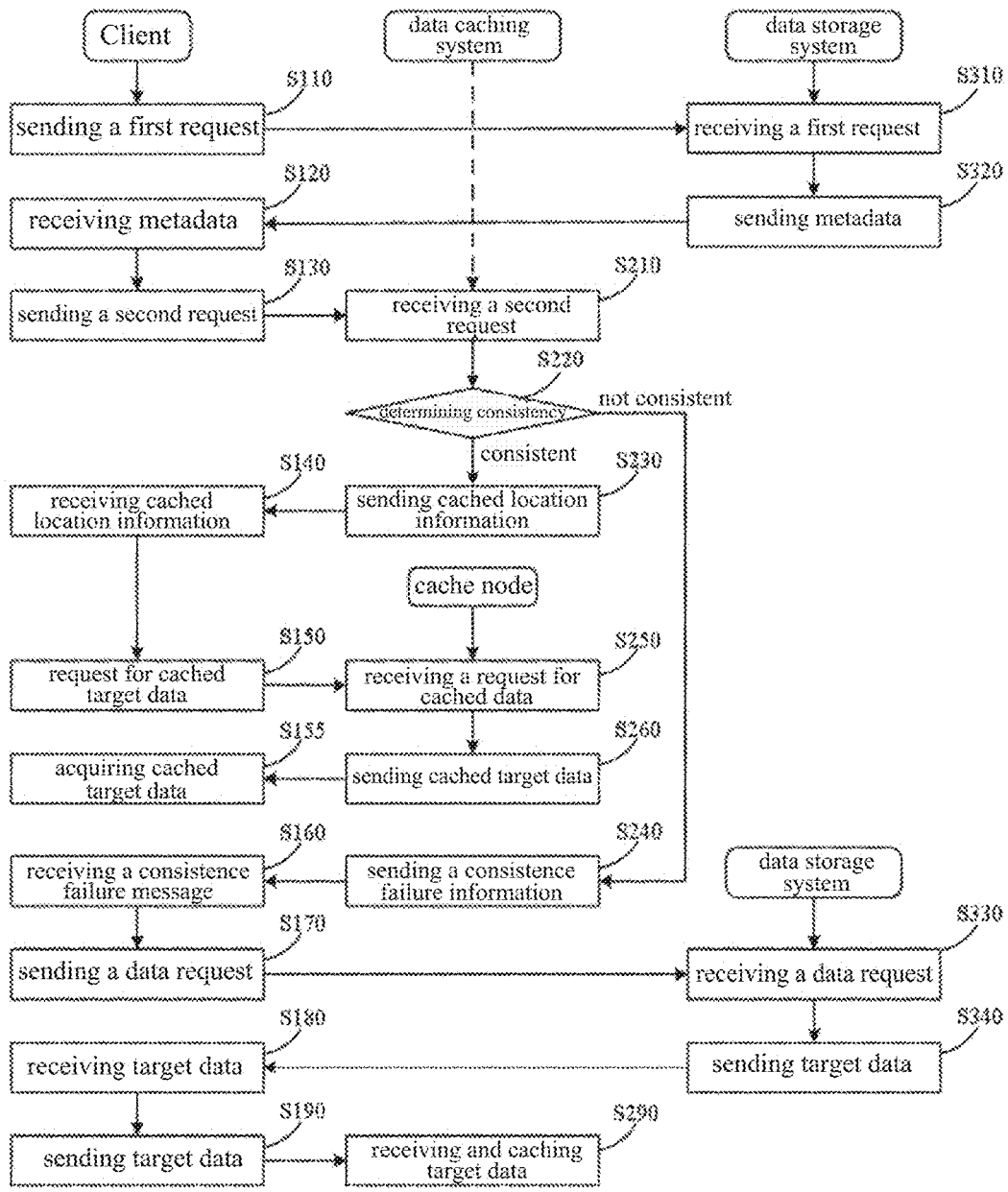
FIG. 5 is a schematic flow diagram of a data caching and reading method according to the present disclosure.

The functions of these apparatus will be described in detail with reference to the flow diagrams of the data access method as shown in FIG. 2 and FIG. 5.

FIG. 5 is a schematic flow diagram of a data caching and reading method according to the present disclosure.

As shown in FIG. 5, in Step S110, the client in the computing service sends a first request for target data to a data storage system through a first request apparatus 110 for example.

Here, the computing service requests for acquiring metadata of target data from the data storage system through a first request initiated by the client. Metadata of the target data may include, for example, an update time (update_time), a CRC check value of a file (checksum), a file size (length), and so forth of the target data (a data file).

The first request may directly request to acquire metadata of the target data on the basis of a file name such as "oss://bucket/directory/file1" maintained by the data storage system.

In Step S310, the data storage system receives a first request, and sends, in Step S320, the metadata of the requested target data (a data file such as "oss://bucket/directory/file1") to the client.

In Step S120, the client receives metadata of the target data from the data storage system through the metadata receiving apparatus 120 for example.

In Step S130, the client sends a second request for target data to the data caching system through a second request apparatus 130 for example, the second request including metadata. Accordingly, through the second request, the client requests the data caching system for acquiring a caching location of the target data.

In Step S210, the name space, for example, of the data caching system receives, through the request receiving apparatus 210 for example, a first request for target data to be acquired sent by the client. As stated above, the first request includes metadata of the target data stored in the data storage system.

In Step S220, the name space, for example, of the data caching system determines, through the consistency determination apparatus 220 for example, whether cached target data which is consistent with target data stored in the data storage system is cached in the data caching system on the basis of metadata of the target data.

Here, it is possible to first determine whether cached target data corresponding to the target data is cached on the basis of identification information of target data such as a file name.

Afterwards, in the case where it is determined that cached target data corresponding to the target data is cached, it is determined whether the cached target data is consistent with the target data on the basis of metadata of the cached target data and metadata of the target data. In the case where the metadata of the cached target data is consistent with that of the target data, it is determined that the cached target data is consistent with the target data. Otherwise, it is determined that the cached target data is inconsistent with the target data.

As shown in FIG. 2, the data caching system may maintain the correspondence between target data (files) and metadata acquired when the target data was previously cached. For example, the file name and metadata such as cyclic redundancy check value, file size, and update time of each cached file such as "oss://bucket/directory/file1" can be recorded accordingly for the above consistency determination.

Here, the data caching system may determine whether there is cached target data corresponding to expected target data through a file name (file_name), and accurately determine whether the target data stored in the current data storage system is consistent with cached target data within the data caching system according to metadata such as an update time (update_time), a CRC check value of a file (checksum), and a file size (length).

In the event of determining that cached target data which is consistent with the target data of the data storage system is cached (consistency) in Step S220, the name space, for example, of the data caching system sends, in Step S230, location information of the cached target data to the client through the first information sending apparatus 230 for example. For example, the information of a cache node that caches this cache target data may be returned to the client as the location information of the cache target data.

Under this circumstance, the client may acquire target data from the data caching system.

Specifically, for example, the client may receive location information of the cached target data, such as the information about a cache node that caches the cached target data, from for example, the name space of the data caching system in Step S140.

In Step S150, the client requests the cached target data from the location (cache node) where the cached target data is located.

In Step S250, a cache node of the data caching system receives the request for the cached target data sent by the client, and in Step S260, the cache node sends the cached target data to the client of the computing service.

In Step S155, the client receives the cached target data from the cache node of the data caching system through the first data acquisition apparatus 155 for example. Accordingly, the acquired cached target data may be directly used for the computing service.

In a case where it is determined in Step S220 that cached target data which is consistent with the target data of the data storage system is not cached (inconsistency), in Step S240, the name space, for example, of the data caching system sends a consistence failure message to the client through the second information sending apparatus 240 for example.

In Step S160, the client receives the consistence failure message from the name space, for example, of the data caching system.

Under this circumstance, the client may acquire the target data directly from the data storage system.

Specifically, for example, a target data request may be sent to the data storage system in Step S170 to request for acquiring the target data.

The data storage system receives the target data request from the client in Step S330, and sends the requested target data to the client in Step S340.

In Step S180, the client receives target data sent from the data storage system through the second data acquisition apparatus 180 for example.

Afterwards, after acquiring target data from the data storage system, the client may further send, in Step S190, the acquired target data to the data caching system through a target data sending apparatus 190, for example. Accordingly, the acquired target data may be directly used in the computing service.

In Step S290, the data caching system receives target data sent from the client, and caches the same to a cache node.

In addition, the name space of the data caching system may further record metadata of target data sent by the client in Step S130 in association with the file name of the cached target data as the basis for later determining the consistency of the target data.

In this way, whether the target data cached by the data caching system is consistent with the target data stored in the data storage system may be directly determined on the basis of metadata of the target data acquired from the data storage system by the client. In the event that there is consistent target data, the client acquires cached target data from a cache node of the data caching system. In the event that there is no consistent target data, the client acquires the target data from the data storage system directly, and sends the acquired target data to the data caching system for caching for later use in reading.

In addition, in the event of determining that cached target data which is consistent with target data of the data storage system is not cached (inconsistent) in Step S220, upon requesting the data storage system for reading target data in Step S170, the client may logically block (LogicBlock) target data (e.g., a file) according to the file size (length) in metadata acquired in Step S120, that is, logically segmenting target data (a file) into a plurality of logic blocks such as logic block 1, logic block 2, logic block 3, . . . logic block n as shown in FIG. 2 according to preset logical data block sizes (Block size), where n is a positive integer.

In this way, the client may directly read corresponding data at a specified location of the data storage system according to logic blocks.

Specifically, when reading data in the data storage system, the client may first determine which logic fragment (a logic block) of the target data (a file) is to be read according to a reading offset (position), and may then directly read, according to the returned metadata in Step S120, data at a specified location (e.g., an initial location of a file+a location corresponding to the offset) without further retrieving metadata services.

On the other hand, after receiving logic blocks of target data from a client, the data caching system may also perform caching according to the logic blocks, for example, caching the same logic block on the same caching node, or caching different logic blocks of a same file (target data) on different caching nodes. The data caching system may maintain a table of the correspondence between the logic blocks of the file (target data) and cache nodes. For example, as shown in FIG. 2, for the file "oss://bucket/directory/file1", the correspondence between a plurality of logic blocks and cache nodes, e.g., <logic block 1, node 1>, <logic block 2, node 1> . . . , are recorded. Accordingly, the indexing relationships between respective logic blocks of a file and cache nodes may be established.

In this way, when requesting for the target data again, the client may also determine which logic block of the target data (a file) is to be read according to the offset of data requested currently by the client in the target data, and perform reading directly at a corresponding cache node in the event of determining, based on metadata, that the cached target data of the data caching system is consistent with the target data stored in the data storage system.

So far, the present disclosure provides a highly efficient data caching solution which is capable of automatically checking whether raw data in a data storage system is changed upon reading data, and caching and updating data efficiently, and may also perform blocked caching efficiently when necessary.

In addition, with regard to the characteristics of cloud-based data storage, the life-cycle management of data caching may also be implemented. When it is found that the cached data is inconsistent with the raw data, timely updating can be implemented.

Accordingly, the data reading and caching solution of the present disclosure may not only efficiently solve the cache consistency problem arising from changes in the underlying data stored in the data storage system, but also introduce a caching mechanism without reducing the availability of the system, thereby solving the bandwidth bottleneck caused by a large amount of hot spot data, and improving the overall resource utilization rate of a cluster.

The data caching and reading solution of the present disclosure can implement strong consistency between cached data and raw data. Through metadata information requested by the client in advance, it can accurately determine whether the current target data (a file) is consistent with the cached target data in a timely and accurate manner.

Moreover, the solution proposed in the present disclosure has good compatibility. A data caching mechanism is introduced on the client side, which is compatible with the original direct path access to the data storage system. When initiating a request for target data, the client may directly use a file name (and a path) maintained by the data storage system. As such, this may avoid changes in paths caused by introducing caching, and thus modifications to existing computing frameworks are not necessary.

Additionally, the solution of the disclosure is based on the client's capability for having direct access to the data storage system, and thus the embodiments of the present disclosure may also have high availability. In case that the data caching system fails, the client at an upper layer may determine, at its discretion, whether to wait for restoration of the data caching system or directly connect the data storage system at the distal end and the like according to strategies so as to avoid reduction in the availability of the system due to introduction of a caching system, which more conforms to the large-scale production scenarios.

It should be understood that the data caching and reading solution of the present disclosure is not only applicable to the data storage system of the Object Storage Services (OSS) mentioned above, but can also be applied to various other data storage systems such as Simple Storage Service (S3), Hadoop distributed file system (HDFS), and Network Attached Storage (NAS).

In fact, various data storage systems at present often record metadata of files and data. Hence, a client requesting data may request metadata corresponding to data from a data storage system, send the same to the caching system for comparison so as to determine the consistency of the cached data. As such, various data storage systems may be used for the data caching and data reading solution of the present disclosure.

Figure 6:
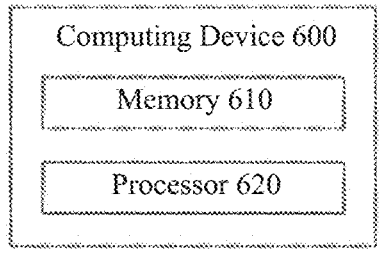
FIG. 6 is a schematic structural diagram of a computing device which may be used to implement the above data reading and caching method according to an embodiment of the present invention.

FIG. 6 shows a schematic structural diagram of a computing device which may be used to implement the data reading and caching method described above according to an embodiment of the present invention.

With reference to FIG. 6, a computing device 600 includes a memory 610 and a processor 620.

The processor 620 may be a multi-core processor, and may also include a plurality of processors. In some embodiments, the processor 620 may include a general-purpose primary processor and one or more special-purpose coprocessors such as graphics processing unit (GPU) and digital signal processor (DSP). In some embodiments, the processor 620 may be implemented by using customized circuits such as an Application Specific Integrated Circuit (hereinafter referred to as ASIC) or a Field Programmable Gate Array (hereinafter referred to as FPGA).

The memory 610 may include various types of storage units such as a system memory, a read-only memory (ROM), and a permanent storage apparatus, wherein the ROM may store static data or instructions required by the processor 620 or other modules of the computer. The permanent storage apparatus may be a readable and writable storage apparatus, and may be a non-volatile storage device which will not lose instructions and data stored even though the computer is powered off. In some embodiments, a mass storage apparatus (such as a magnetic or compact disk and a flash memory) is used as a permanent storage apparatus. In yet further embodiments, the permanent storage apparatus may be a removable storage device (such as a floppy disk and a compact disk drive). The system memory may be a readable and writable storage device or a volatile readable and writable storage device such as dynamic random-access memory. Instructions and data required when some or all processors are operating may be stored in the system memory. In addition, the memory 610 may include any combinations of computer readable storage media, including various types of semiconductor memory chips (DRAM, SRAM, SDRAM, flash memory, and programmable read only memory). Magnetic disks and/or compact disks may also be used. In some embodiments, the memory 610 may include a readable and/or writable removable storage device such as laser disk (CD), read-only digital versatile optical disk (e.g., DVD-ROM and bi-layered DVD-ROM), read-only blue-ray disk, ultra-density optical disk, flash memory card (e.g., SD card, min SD card, Micro-SD card, and the like), magnetic floppy disk and so forth. The computer readable storage media do not include carrier waves and transitory electronic signals through wireless or wired transmission.

The memory 610 is stored thereon with executable codes which, when executed by the processor 620, may enable the processor 620 to implement the data reading and caching methods mentioned above.

The data reading and caching solution according to the present invention are described in detailed above with reference to the accompanying drawings.

In addition, the methods according to the present invention may further be implemented as a computer program or computer program product, the computer program or the computer program product including computer program code instructions for executing respective steps above defined in the above methods of the present invention.

As an alternative, the present invention may further be implemented as a non-transitory machine-readable storage medium (or a computer-readable storage medium or a machine-readable storage medium) stored thereon with executable codes (or computer programs or computer instruction codes) which, when executed by a processor of an electronic device (or a computing device, a server and the like), enable the processor to execute respective steps of the above methods according to the present invention.

Those skilled in the art would also understand that various exemplary logic blocks, modules, circuits, and algorithmic steps as described in connection with the present disclosure may be implemented as electronic hardware, computer software or a combination thereof.

The flow diagrams and block diagrams in the accompanying drawings show the architecture, functionality, and operation of possible implementations of systems and methods according to various embodiments of the present invention. In this regard, each block in a flow diagram or block diagram may represent a module, a program segment or a portion of codes including one or more executable instructions for implementing specified logical functions. It should also be noted that in some alternative implementations, the marked functions in the blocks may also occur in a different order from that marked in the accompanying drawings. For example, two successive blocks may be executed basically in parallel as a matter of fact. They may also be executed in a contrary order sometimes, depending on the functions involved. It should also be noted that each block in the block diagrams and/or flow diagrams and a combination of blocks in the block diagrams and/or flow diagrams may be implemented by a special-purpose system based on hardware for executing specified functions or operations, or may be implemented by a combination of special-purpose hardware and computer instructions.

Respective embodiments of the present inventions are described above. The above description is illustrative, not exhaustive, and is not limited to respective embodiments disclosed. Without deviating from the scope and spirit of respective embodiments illustrated, multiple modifications and changes are apparent to those skilled in the art. The terminology used herein is chosen to best explain the principles, practical applications, or improvements to the technology in the marketplace of the embodiments, or to enable others of ordinary skill in the art to understand the embodiments disclosed herein.

What is claimed is:

1. A data caching method for a data caching system, wherein the data caching system is configured to cache target data stored in a data storage system, and the data storage system is configured to store the target data and metadata of the target data, the method comprises:

receiving a request for target data to be acquired sent by a client, the request comprising metadata of the target data stored in the data storage system, wherein the metadata of the target data is acquired by the client from the data storage system; and determining, based on the metadata of the target data, whether data which is consistent with the target data stored in the data storage system is cached in the data caching system.

2. The data caching method according to claim 1, further comprising:

sending location information of the cached data to the client in the case of determining that the cached data which is consistent with the target data of the data storage system is cached; and/or sending a consistence failure message to the client in the case of determining that the data which is consistent with the target data of the data storage system is not cached.

3. The data caching method according to claim 2, in the case of determining that the data which is consistent with the target data of the data storage system is not cached, the method further comprising:

acquiring, by the client, the target data from the data caching system;

receiving, from the client, the target data acquired by the client from the data storage system; and caching the target data.

4. The data caching method according to claim 1, the step of determining whether the data which is consistent with the target data stored in the data storage system is cached in the data caching system comprising:

determining, based on identification information of the target data, whether data corresponding to the target data is cached; and determining, based on metadata of the data and the metadata of the target data, whether the cached data is consistent with the target data in the case of determining that the data corresponding to the target data is cached.

5. The data caching method according to claim 1, wherein the metadata of the target data comprises at least one of an update time, a cyclic redundancy check value, and a data size of the target data.

6. A data reading method, comprising:

sending a first request for target data to a data storage system, wherein the data storage system is configured to store the target data and metadata of the target data;

receiving the metadata of the target data from the data storage system, wherein the metadata of the target data is used as a basis for determining consistency of cached data; and sending a second request for the target data to a data caching system, the second request comprising the metadata, wherein the data caching system is configured to cache the target data stored in the data storage system.

7. The data reading method according to claim 6, further comprising:

acquiring the target data from the data caching system in a case where it is determined by the data caching system, based on the metadata, that data which is consistent with the target data of the data storage system is cached; and/or acquiring the target data from the data storage system in a case where it is determined by the data caching system, based on the metadata, that data which is consistent with the target data of the data storage system is not cached.

8. The data reading method according to claim 7, further comprising:

sending the acquired target data to the data caching system after acquiring the target data from the data storage system.

9. A data access system, comprising: a data storage system, a data caching system, and a client, wherein the data storage system is configured to store target data and metadata of the target data, and the data caching system is configured to cache the target data, and wherein the client sends a first request for target data to the data storage system;

the data storage system returns metadata of the target data to the client in response to the first request;

the client sends a second request for the target data to the data caching system, the second request comprising the metadata;

the data caching system determines, based on the metadata of the target data, whether data which is consistent with the target data stored in the data storage system is cached in the data caching system;

the data caching system sends location information of the data to the client in the case of determining that the data which is consistent with the target data of the data storage system is cached, the client acquires the target data from the data caching system;

the data caching system sends a consistence failure message to the client in the case of determining that the data which is consistent with the target data of the data storage system is not cached, the client acquires the target data from the data storage system and sends the acquired target data to the data caching system, and the data caching system caches the target data.

10. A computing device, comprising:

a processor; and a memory stored thereon with executable codes which, when executed by the processor, enable the processor to implement the method of claim 1.

11. A non-transitory machine-readable storage medium stored thereon with executable codes, which, when executed by a processor of an electronic device, enable the processor to implement the method of claim 1.

12. A computing device, comprising:

a processor; and a memory stored thereon with executable codes which, when executed by the processor, enable the processor to implement the method of claim 2.

13. A computing device, comprising:
a processor; and
a memory stored thereon with executable codes which, when executed by the processor, enable the processor to implement the method of claim 3.

14. A computing device, comprising:
a processor; and
a memory stored thereon with executable codes which, when executed by the processor, enable the processor to implement the method of claim 4.

15. A computing device, comprising:
a processor; and
a memory stored thereon with executable codes which, when executed by the processor, enable the processor to implement the method of claim 5.

16. A computing device, comprising:
a processor; and
a memory stored thereon with executable codes which, when executed by the processor, enable the processor to implement the method of claim 6.

17. A computing device, comprising:
a processor; and
a memory stored thereon with executable codes which, when executed by the processor, enable the processor to implement the method of claim 7.

18. A computing device, comprising:
a processor; and
a memory stored thereon with executable codes which, when executed by the processor, enable the processor to implement the method of claim 8.

19. A non-transitory machine-readable storage medium stored thereon with executable codes, which, when executed by a processor of an electronic device, enable the processor to implement the method of claim 2.

20. A non-transitory machine-readable storage medium stored thereon with executable codes, which, when executed by a processor of an electronic device, enable the processor to implement the method of claim 3.

\* \* \* \* \*